US012730752B2

(12) United States Patent
Guo et al.

(10) Patent No.: US 12,730,752 B2
(45) Date of Patent: Sep. 8, 2026

(54) METHOD AND DEVICE FOR FLEXIBLE TAG FILTERING

(71) Applicant: Samsung Electronics Co., Ltd., Gyeonggi-do (KR)

(72) Inventors: Victor J. Guo, Austin, TX (US); Shailendra Aulakh, Austin, TX (US); Xiaoping Ao, Austin, TX (US)

(73) Assignee: Samsung Electronics Co., Ltd. (KR)

( * ) Notice: Subject to any disclaimer, the term of this patent is extended or adjusted under 35 U.S.C. 154(b) by 7 days.

(21) Appl. No.: 18/935,031

(22) Filed: Nov. 1, 2024

(65) Prior Publication Data

US 2026/0050552 A1 Feb. 19, 2026

Related U.S. Application Data

(60) Provisional application No. 63/683,420, filed on Aug. 15, 2024.

(51) Int. Cl.
*G06F 12/08* (2016.01)
*G06F 12/0802* (2016.01)

(52) U.S. Cl.
CPC ................................ *G06F 12/0802* (2013.01)

(58) Field of Classification Search
CPC .................................................. G06F 12/0802
See application file for complete search history.

(56) References Cited

U.S. PATENT DOCUMENTS

| | | | |
|---|---|---|---|
| 6,370,617 B1 | 4/2002 | Lu et al. | |
| 7,836,253 B2 | 11/2010 | Chiba et al. | |
| 8,904,115 B2 | 12/2014 | Chachad et al. | |
| 10,713,172 B2 | 7/2020 | Di et al. | |
| 11,119,924 B2 | 9/2021 | Ito | |
| 2009/0094418 A1 | 4/2009 | Warner et al. | |
| 2013/0042078 A1 | 2/2013 | Jalal et al. | |
| 2013/0132675 A1* | 5/2013 | Sleiman | G06F 12/0864 711/E12.024 |
| 2024/0086325 A1 | 3/2024 | Song et al. | |

FOREIGN PATENT DOCUMENTS

WO WO 2023/196335 10/2023

* cited by examiner

*Primary Examiner* — Jae U Yu
(74) *Attorney, Agent, or Firm* — The Farrell Law Firm, P.C.

(57) ABSTRACT

A method and device are provided in which a request is received at a cache memory. The request includes a first tag, and the first tag includes bits. A first comparison is performed of a first subset of the bits to entries of a first storage of the cache memory. Each entry of the first storage comprises a subset of bits of a corresponding tag in a second storage of the cache memory. One or more potential matching entries of the second storage for the request are determined based on the first comparison. In response to the determining the one or more potential matching entries, a second comparison is performed of the bits to tags of the one or more potential matching entries to determine whether the second storage comprises a matching entry for the request.

20 Claims, 6 Drawing Sheets

METHOD AND DEVICE FOR FLEXIBLE TAG FILTERING

CROSS-REFERENCE TO RELATED APPLICATION

This application claims the priority benefit under 35 U.S.C. § 119(c) of U.S. Provisional Application No. 63/683,420, filed on Aug. 15, 2024, the disclosure of which is incorporated by reference in its entirety as if fully set forth herein.

TECHNICAL FIELD

The disclosure generally relates to a cache memory of a storage device. More particularly, the subject matter disclosed herein relates to tag filtering in the cache memory.

SUMMARY

In modern computing systems, the cache memory plays a crucial role in bridging the speed gap between a processor and a main memory. Cache memories are designed to store frequently accessed data to reduce the time it takes for the processor to retrieve this data, thereby improving overall system performance. However, as the demand for faster and more efficient computing continues to grow, so does the complexity of cache systems. This complexity often leads to increased energy consumption, which is a significant concern in both mobile and large-scale computing environments One of the primary challenges in cache memory design is managing the trade-off between performance and energy efficiency. Traditional cache systems often require accessing a large number of tag bits to determine whether a particular data entry is present in the cache memory, which can be energy-intensive. For example, in both parallel and serial tag-data caches, high associativity and complicated replacement policies may result in many bits being read out of the tag data storage structures. As a result, tag access to determine hit or miss may read significantly more data than what is optimal for a particular request.

Designing around this may be complicated by the multiple cycle nature of static random access memory (SRAM) reads in advanced processes in performance-sensitive applications. Additionally, many cache memories require more data/metadata than just a necessary way that hits for performance enhancement reasons (e.g., early-write backs of dirty ways where maintaining empty ways is necessary for maximal performance).

Techniques such as bloom filtering, way prediction, and serial way access have been explored to address these challenges. Bloom filtering involves hashing tag bits to reduce the number of ways accessed, but it introduces additional encoding and decoding complexity. Way prediction attempts to predict the cache way that will be accessed, but may lead to variable latency and increased logic complexity. Serial way access reduces parallelism in accessing tag data, which can also affect performance. As such, there is a need for a solutions that can enhance cache efficiency while minimizing energy consumption and maintaining performance To overcome these issues a filtering algorithm may be applied to multi-cycle tag accesses that uses a subset of tag bits. This approach improves on previous methods by improving power savings while keeping latency penalties fixed.

In an embodiment, a method is provided in which a request is received at a cache memory. The request includes a first tag, and the first tag includes bits. A first comparison is performed of a first subset of the bits to entries of a first storage of the cache memory. Each entry of the first storage comprises a subset of bits of a corresponding tag in a second storage of the cache memory. One or more potential matching entries of the second storage for the request are determined based on the first comparison. In response to determining the one or more potential matching entries, a second comparison is performed of the bits to tags of the one or more potential matching entries to determine whether the second storage comprises a matching entry for the request.

In an embodiment, a storage device is provided that includes a cache memory configured to receive a request. The request includes a first tag, and the first tag includes bits. The cache memory includes a first storage that includes entries with a subset of bits of corresponding tags in a second storage. The cache memory also includes a first comparator configured to perform a first comparison of a first subset of the bits of the first tag to the entries of the first storage. The cache memory further includes a selector configured to select one or more potential matching entries of the second storage for the request based on the first comparison. The cache memory also includes the second storage, and a second comparator configured to perform a second comparison of the bits of the first tag to tags of the one or more potential matching entries to determine whether the second storage comprises a matching entry for the request.

In an embodiment, a UE is provided that includes a processor and a non-transitory computer readable storage medium storing instructions. When executed, the instructions cause the processor to receive a request at a cache memory. The request includes a first tag, and the first tag includes bits. The instructions also cause the processor to perform a first comparison of a first subset of the bits to entries of a first storage of the cache memory. Each entry of the first storage comprises a subset of bits of a corresponding tag in a second storage of the cache memory. The instructions further cause the processor to determine one or more potential matching entries of the second storage for the request based on the first comparison. The instructions also cause the processor to, in response to determining the one or more potential matching entries, perform a second comparison of the bits to tags of the one or more potential matching entries to determine whether the second storage comprises a matching entry for the request.

BRIEF DESCRIPTION OF THE DRAWING

In the following section, the aspects of the subject matter disclosed herein will be described with reference to exemplary embodiments illustrated in the figures, in which.

DETAILED DESCRIPTION

Figure 1:
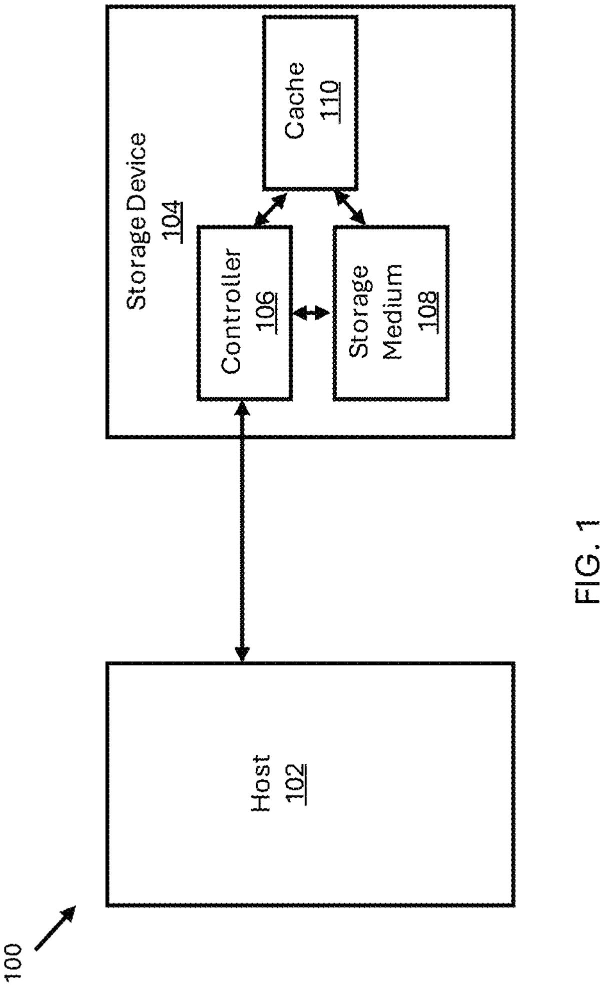
FIG. 1 is a diagram illustrating a data storage management system for processing commands in an electronic device, according to an embodiment.

In the following detailed description, numerous specific details are set forth in order to provide a thorough understanding of the disclosure. It will be understood, however, by those skilled in the art that the disclosed aspects may be practiced without these specific details. In other instances, well-known methods, procedures, components and circuits have not been described in detail to not obscure the subject matter disclosed herein.

Reference throughout this specification to "one embodiment" or "an embodiment" means that a particular feature, structure, or characteristic described in connection with the embodiment may be included in at least one embodiment disclosed herein. Thus, the appearances of the phrases "in one embodiment" or "in an embodiment" or "according to one embodiment" (or other phrases having similar import) in various places throughout this specification may not necessarily all be referring to the same embodiment. Furthermore, the particular features, structures or characteristics may be combined in any suitable manner in one or more embodiments. In this regard, as used herein, the word "exemplary" means "serving as an example, instance, or illustration." Any embodiment described herein as "exemplary" is not to be construed as necessarily preferred or advantageous over other embodiments. Additionally, the particular features, structures, or characteristics may be combined in any suitable manner in one or more embodiments. Also, depending on the context of discussion herein, a singular term may include the corresponding plural forms and a plural term may include the corresponding singular form. Similarly, a hyphenated term (e.g., "two-dimensional," "pre-determined," "pixel-specific," etc.) may be occasionally interchangeably used with a corresponding non-hyphenated version (e.g., "two dimensional," "predetermined," "pixel specific," etc.), and a capitalized entry (e.g., "Counter Clock," "Row Select," "PIXOUT," etc.) may be interchangeably used with a corresponding non-capitalized version (e.g., "counter clock," "row select," "pixout," etc.). Such occasional interchangeable uses shall not be considered inconsistent with each other.

Also, depending on the context of discussion herein, a singular term may include the corresponding plural forms and a plural term may include the corresponding singular form. It is further noted that various figures (including component diagrams) shown and discussed herein are for illustrative purpose only, and are not drawn to scale. For example, the dimensions of some of the elements may be exaggerated relative to other elements for clarity. Further, if considered appropriate, reference numerals have been repeated among the figures to indicate corresponding and/or analogous elements.

The terminology used herein is for the purpose of describing some example embodiments only and is not intended to be limiting of the claimed subject matter. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element or layer is referred to as being on, "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and case of discussion only; it does not imply that the construction or architectural details of such components or units are the same across all embodiments or such commonly-referenced parts/modules are the only way to implement some of the example embodiments disclosed herein.

Unless otherwise defined, all terms (including technical and scientific terms) used herein have the same meaning as commonly understood by one of ordinary skill in the art to which this subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the term "module" refers to any combination of software, firmware and/or hardware configured to provide the functionality described herein in connection with a module. For example, software may be embodied as a software package, code and/or instruction set or instructions, and the term "hardware," as used in any implementation described herein, may include, for example, singly or in any combination, an assembly, hardwired circuitry, programmable circuitry, state machine circuitry, and/or firmware that stores instructions executed by programmable circuitry. The modules may, collectively or individually, be embodied as circuitry that forms part of a larger system, for example, but not limited to, an integrated circuit (IC), system on-a-chip (SoC), an assembly, and so forth.

An electronic device, according to one embodiment, may be one of various types of electronic devices utilizing storage devices (e.g., memory devices). The electronic device may use any suitable storage standard, such as, for example, peripheral component interconnect express (PCIe), nonvolatile memory express (NVMe), NVMe-over-fabric (NVMeoF), advanced extensible interface (AXI), ultra path interconnect (UPI), ethernet, transmission control protocol/Internet protocol (TCP/IP), remote direct memory access (RDMA), RDMA over converged ethernet (ROCE), fibre channel (FC), infiniband (IB), serial advanced technology attachment (SATA), small computer systems interface (SCSI), serial attached SCSI (SAS), Internet wide-area RDMA protocol (iWARP), and/or the like, or any combination thereof. In some embodiments, an interconnect interface may be implemented with one or more memory semantic and/or memory coherent interfaces and/or protocols including one or more compute express link (CXL) protocols such as CXL.mem, CXL.io, and/or CXL.cache, Gen-Z, coherent accelerator processor interface (CAPI), cache coherent interconnect for accelerators (CCIX), and/or the like, or any combination thereof. Any of the memory devices may be implemented with one or more of any type of memory device interface including double data rate (DDR), DDR2, DDR3, DDR4, DDR5, low-power DDR (LPDDRX), open memory interface (OMI), Nvlink high bandwidth memory (HBM), HBM2, HBM3, and/or the like. The electronic devices may include, for example, a portable communication device (e.g., a smart phone), a computer, a portable multimedia device, a portable medical device, a camera, a wearable device, or a home appliance. However, an electronic device is not limited to those described above.

FIG. 1 is a diagram illustrating a data storage management system for processing commands in an electronic device, according to an embodiment. A storage system 100 includes a host 102 and a storage device 104 (e.g., a memory device). Although one host and one storage device are depicted, the storage system 100 may include multiple hosts and/or multiple storage devices. The storage device 104 may be an SSD, a universal flash storage (UFS), etc. The storage device 104 includes a controller 106, a storage medium 108, and a cache memory 110 in communication with each other. The controller 106 may be an SSD controller, a UFS controller, etc. The controller 106 may include one or more processors, one or more error correction circuits, one or more FPGAs, one or more host interfaces, one or more flash bus interfaces, etc., or a combination thereof. The controller 106 may be configured to facilitate transfer of data/commands between the host 102 and the storage medium 108. The host 102 sends data/commands to the storage device 104 to be received by the controller 106 and processed in conjunction with the storage medium 108. The storage medium 108 may include a volatile memory, a non-volatile memory, or both, and may include one or more flash memory chips (or other storage media). The cache memory 110 may store data or contents of storage medium 108 that are used frequently so that the controller 106 may easily access that data in a shorter time. When the controller 106 needs to access memory, it may first check the cache memory 110. If the data is not found in the cache memory 110, the controller may check the storage medium 108.

Figure 2:
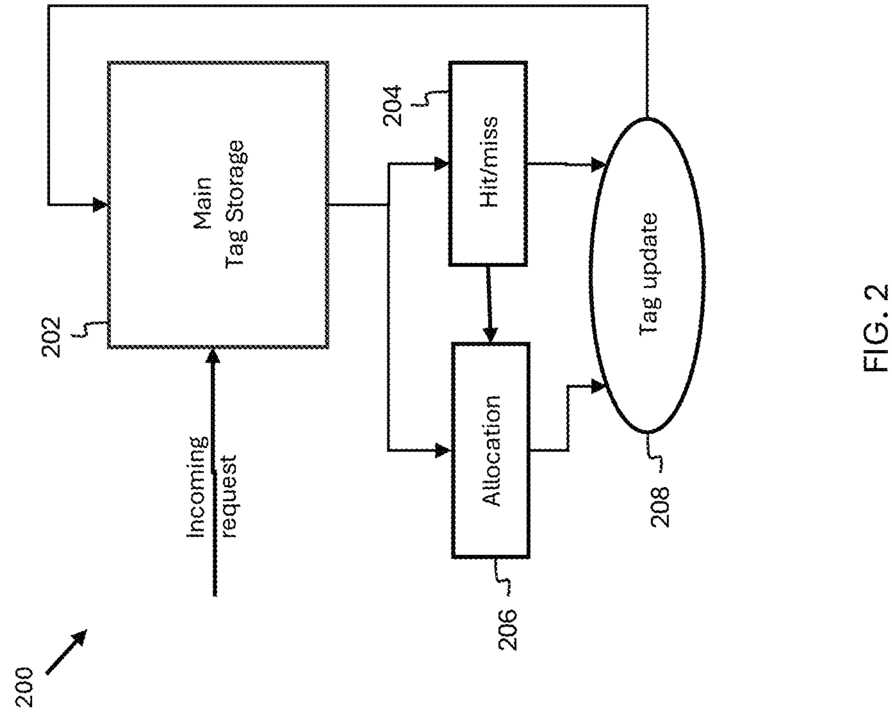
FIG. 2 is a diagram illustrating a cache memory.

FIG. 2 is a diagram illustrating a cache memory. A cache memory 200 (e.g., the cache memory 110 of FIG. 1) may include a main tag storage 202, a hit/miss module 204, an allocation module 206, and a tag update module 208. A request from a controller or processor may be received at the main tag storage 202. An address for the request may include a set and a tag as described below with respect to FIG. 3. Sets and tags in the main tag storage 202 may be compared to the set and tag of the incoming request to determine whether a matching tag exists in an entry of the main tag storage 202 at the hit/miss module 204. If the matching tag exists in an entry of the main tag storage 202, data for the entry may be retrieved and the main tag storage 202 may be updated by the tag update module 208. The allocation module 206 may bring in new tag data if it is determined that the matching tag does not exist in the main tag storage 202. The tag update module 208 may then update the main tag storage 202 with the newly allocated tag data.

Figure 3:
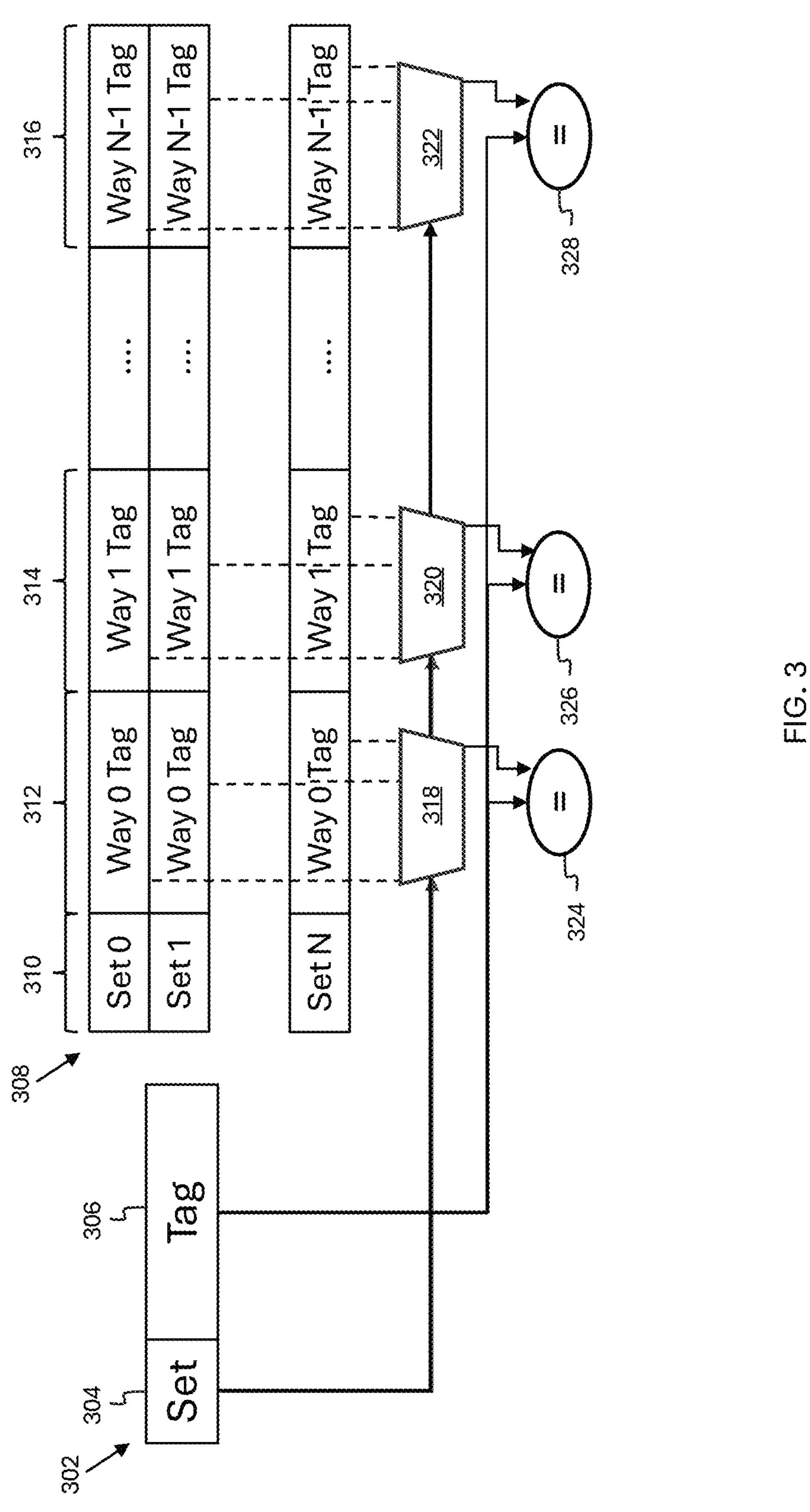
FIG. 3 is a diagram illustrating a primary compare address match (CAM) stage for a cache memory.

FIG. 3 is a diagram illustrating a primary CAM stage for a cache memory. A request address 302 may include a set number 304 and a tag 306. The address 302 may also include a byte offset that specifies a byte within a cache line being accessed. A tag storage 308 may include a number of sets 310 (e.g., 0 through N), with each set having a series of tags (e.g., way 0 312, way 1 314, way n−1 316). For a given cache line, in order to generate a hit, all bits of a tag match the tag 306 of the request address 302. As a default, the cache may check all bits at once across all ways in a given set.

For example, the set number 304 of the request address 302 may be provided to a multiplexer of each way of the tag storage 308. Embodiments are not limited to the use of a multiplexer, and a read port of a memory may be used for data stored in SRAM, for example. Specifically, the set number 304 may be provided to a first multiplexer 318, which also receives way 0 tags for each of the sets 310. The first multiplexer 318 may output a single way 0 tag for the set number 304. The set number 304 may also be provided to a second multiplexer 320, which also receives way 1 tags for each of the sets 310. The second multiplexer 320 may output a single way 1 tag for the set number 304. The set number 304 may further be provided to a third multiplexer 322, which also receives way N−1 tags for each of the sets 310. The third multiplexer 322 may output a single way N−1 tag for the set number 304.

The tag 306 of the request address 302 may be provided to a comparator of each way of the tag storage 308. Specifically, the single way 0 tag for the set number 304 may be provided from the first multiplexer 318 to a first comparator 324 to determine whether it matches the tag 306 of the request address 302. The single way 1 tag for the set number 304 may be provided from the second multiplexer 320 to a second comparator 326 to determine whether it matches the tag 306 of the request address 302. The single way N−1 tag may be provided from the third multiplexer 322 to the third comparator 328 to determine whether it matches the tag 306 of the request address 302.

Accordingly, for N ways on an M bit tag, there may N×M bit comparisons. As the number of ways grows, the cost of maintaining a more associative cache may become more expensive. If a request is expected to miss, the full N×M compares may be wasteful if optimally only a couple of bits per way are needed to determine a miss.

For mobile graphics processing units (GPUs), energy efficiency may be more critical than absolute possible performance. Some loss in latency may be acceptable for energy improvement. Overall performance is mostly throughput driven, and not latency driven, unlike in high performance computing (HPC) central processing unit (CPU) designs.

The measured similarity of cache tags within a set may be low, and a miss may be determined by only checking a subset of bits. For example, performing cache tag checks in GPU L2 may consume a significant amount energy and may have relatively low hit rates.

According to an embodiment, tags that are guaranteed to miss may be filtered out to reduce the amount of data that is compared. A pre-check stage may check K-bits of the M bit tag across all ways of the set (K may be significantly less than M). This pre-check may determine a number of true misses. Those ways that pass this check may be considered potential hits. Storage for the K-bits may be a duplicate of the main tag storage or may be a split portion of the tag storage. However, splitting the tag storage may add more handling overhead for hazards that occur when tag check to data access takes multiple cycles (e.g., read-after-write or read-after-read).

The primary check stage may only read the full M bit (or M-K bits) tags and/or other per way data of the set for the ways that pass the pre-check stage. The primary check stage may also read the dirty ways depending on replacement data and allocation. If the same set is modified, data for the way that was modified may also be read if the modification occurred between the pre-check and the primary check. The average amount of data read and compared for tag checking may be reduced by up to (100−(K/M*100)) % in an GPU L2 cache.

Figure 4:
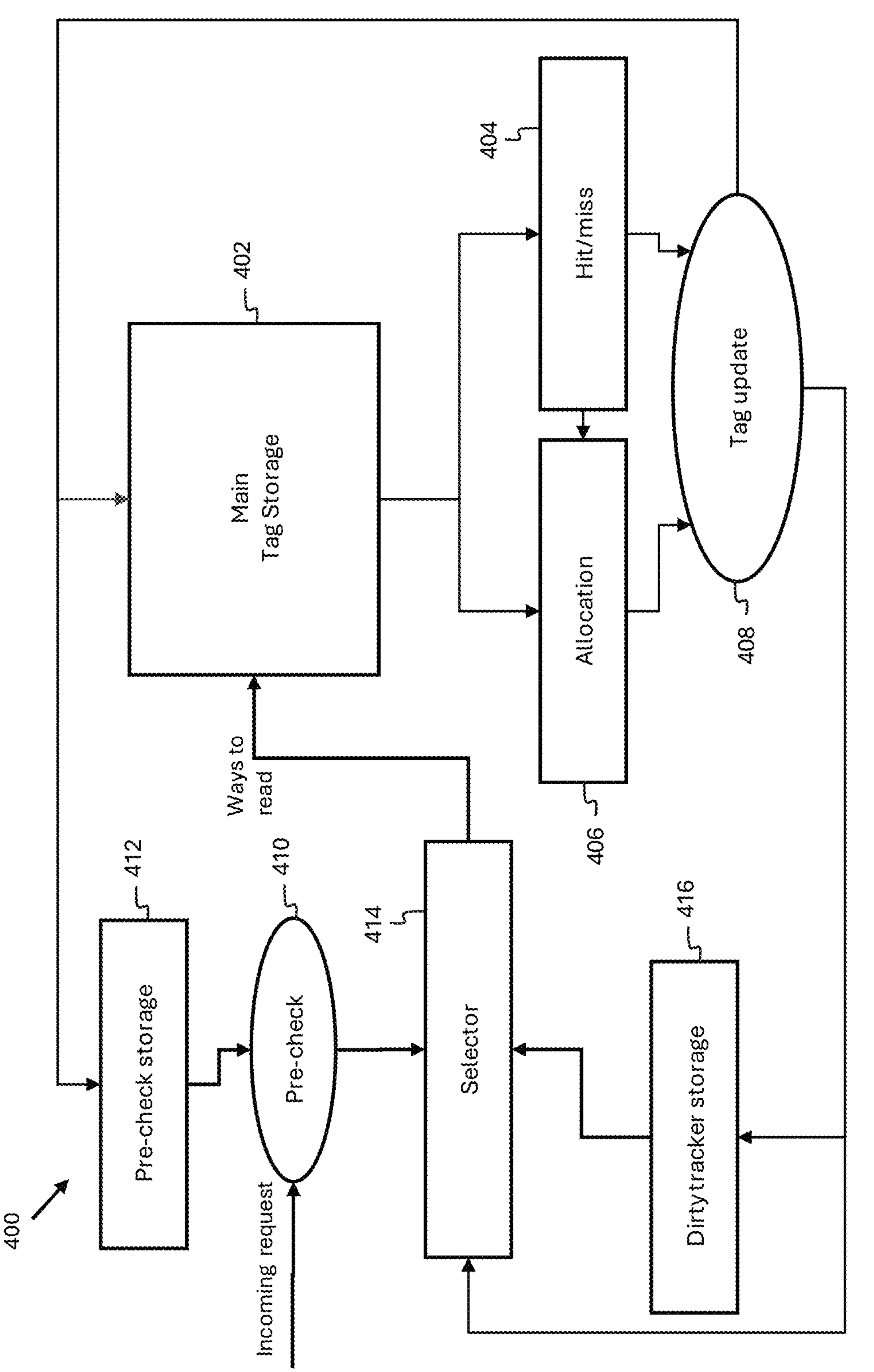
FIG. 4 is a diagram illustrating a cache memory, according to an embodiment.

FIG. 4 is a diagram illustrating a cache memory, according to an embodiment. A request from a controller or processor may be received at a pre-check module 410 of a cache memory 400. As described above with respect to FIG. 3, an address of the request may include a set number and a tag. The pre-check module 410 may compare a subset of bits of the tag with subsets of bits in pre-check storage 412. The pre-check storage 412 may include a subset of bits for each tag across all ways of the sets in a main tag storage 402. The pre-check module 410 may filter out clear misses in a manner similar to that described above with respect to FIG. 3, resulting potential hits with matching subsets of bits. Specifically, pre-check of the pre-check storage may utilize a series of multiplexers and comparators that check a subset of bits from the tag of the request.

A selector module 414 may select those ways that are to be read (or treated as potential hits) from the main tag storage 402. The selected ways may include those having tags with matching subsets of bits, as determined by the pre-check module 410. The selected ways may also include additional ways added by an override indicator from a dirty tracker storage 416 (e.g., one or more alternative storage sources), which may be dependent on replacement data and data allocation. For example, the dirty tracker storage 416 may include ways having tags that were updated more recently than the pre-check storage 412 and/or ways with tags that are already in flight (e.g., grabbed by another request). Accordingly, the dirty tracker storage 416 may provide way exceptions (or overrides) to the selector 414 that should also be selected to be read from the main tag storage 402.

For the selected ways in the main tag storage 402, corresponding tags that are potential hits may be compared to the tag of the incoming request to determine whether a matching tag exists in the main tag storage 402 at hit/miss module 404. This comparison may involve all of the tag bits or only the remaining subset of the tag bits that was not compared in the pre-check module 410. If the matching tag exists in the main tag storage 202, data corresponding to that entry may be retrieved. A tag update module 408 may update the main tag storage 402, the pre-check storage 412, the selector 414, and the dirty tracker storage 416. An allocation module 406 may update the main tag storage 402 to remove an unnecessary way in order to add a currently missing way into the main tag storage 402, if it is determined that the matching tag does not exist in the main tag storage 402. The tag update module 408 may then update the main tag storage 402, the pre-check storage 412, the selector 414, and the dirty tracker storage 416.

Accordingly, the average number of bits needed to be read from the tag storage structures may be reduced, and thus, the energy requirements may also be reduced. Adding the preliminary check is the primary change that modifies functionality, while some pipeline stages may be inserted, and a new storage structure may be inserted that contains the preliminary check data. The functionality of the original hit/miss module may remain unchanged.

Figure 5:
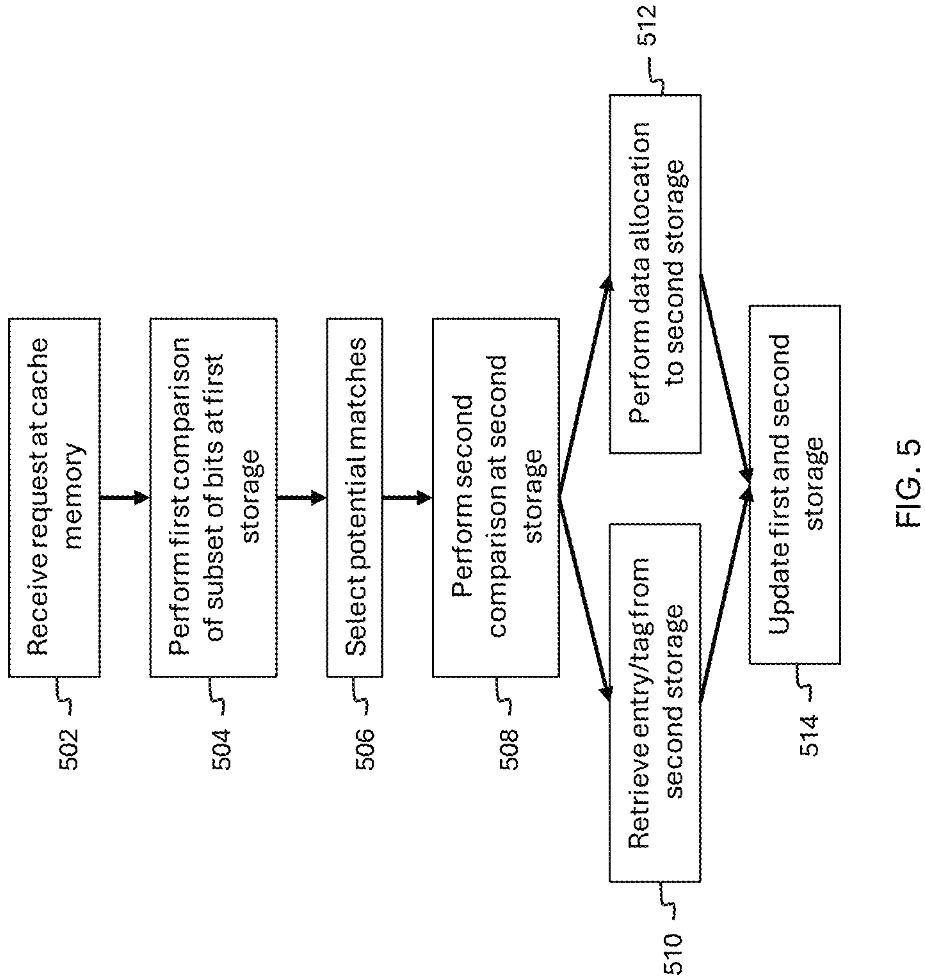
FIG. 5 is a flowchart illustrating a method for filtering tags of a cache memory, according to an embodiment.

FIG. 5 is a flowchart illustrating a method for retrieving data from a cache memory, according to an embodiment. At 502, a request may be received at the cache memory. The request may include a first tag and a set number. The first tag includes bits.

At 504, a first comparison may be performed between a first subset of the bits of the first tag and entries of a first storage of the cache memory. Each entry of the first storage may include a subset of bits of a corresponding tag in a second storage of the cache memory. The first storage may include a plurality of sets, with each set including a number of entries. The first subset of the bits may be compared to entry bits in the first storage. The one or more potential matching entries may be determined based on corresponding entries in the first storage that match the first subset of bits. The first comparison may be performed across entries of the set number in the first storage.

At 506, one or more potential matching entries of the second storage for the request may be selected based on the first comparison. An override indication may be received from one or more alternative storage sources enabling selection of additional second storage entries. Overridden selections may be due to allocation/data replacement policies or functional necessity due to synchronization mismatches between the first stage storage and the second stage storage. If no potential matching entries are selected, the second storage does not include a matching entry for the request.

In case that there are one or more potential matching entries, a second comparison may be performed between the bits and tags of the one or more potential matching entries to determine whether the second storage includes a matching entry for the request, at 508. Each of the bits of the first tag may be compared to corresponding bits of the tags of the second storage, and the matching entry may include a second tag with the bits of the first tag. Alternatively, a remaining subset of the bits of the first tag may be compared to corresponding subsets of bits of the tags of the second storage, and the matching entry includes the remaining subset of the bits of the first tag.

If the second storage includes the matching entry, data of the matching entry may be retrieved from the second storage at 510. If the second storage does not include the matching entry, a matching tag may be allocated to the second storage at 512. At 514, the first storage and the second storage are updated based on the retrieval or the allocation.

Figure 6:
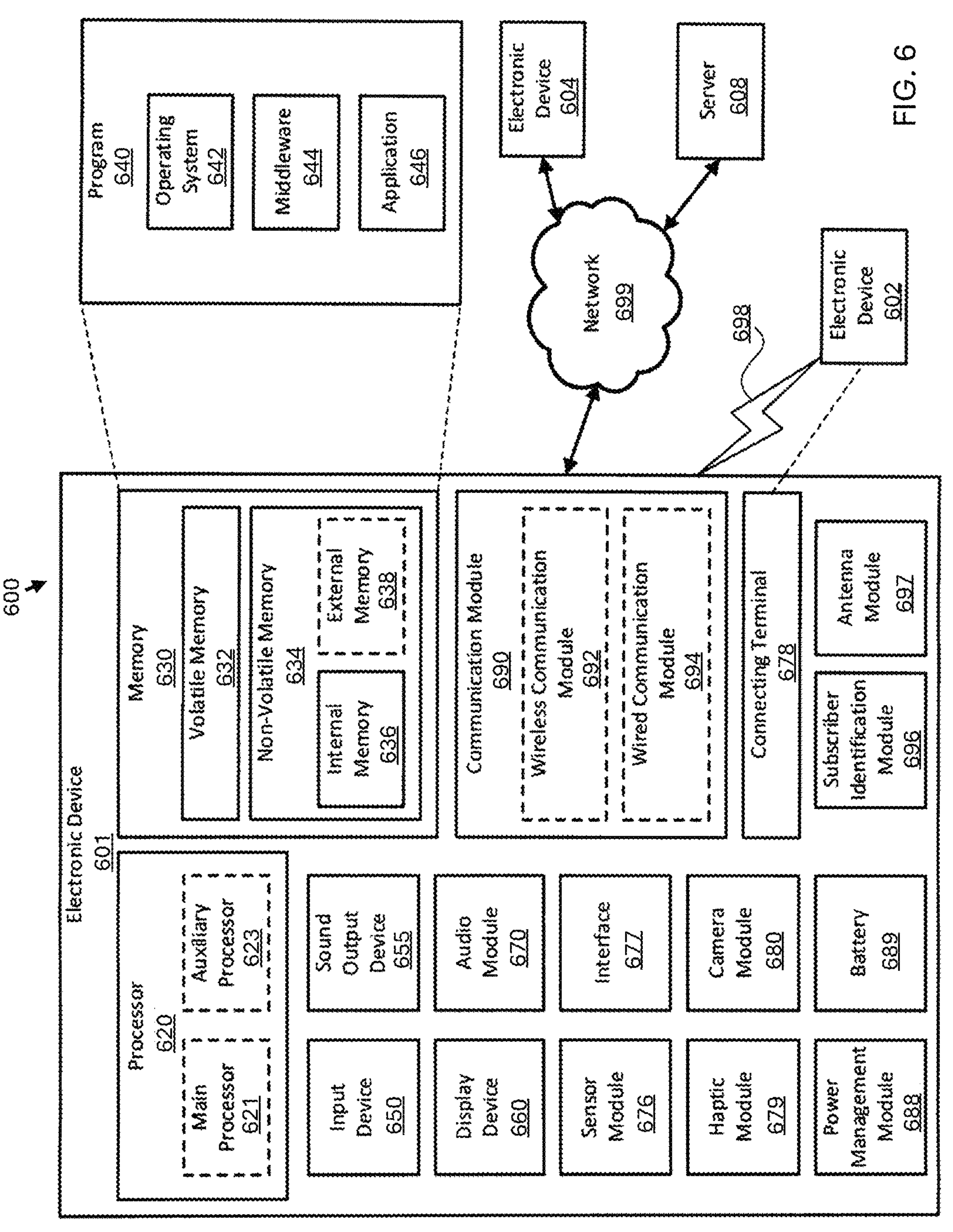
FIG. 6 is a block diagram of an electronic device in a network environment, according to an embodiment.

FIG. 6 is a block diagram of an electronic device in a network environment 600, according to an embodiment.

Referring to FIG. 6, an electronic device 601 in a network environment 600 may communicate with an electronic device 602 via a first network 698 (e.g., a short-range wireless communication network), or an electronic device 604 or a server 608 via a second network 699 (e.g., a long-range wireless communication network). The electronic device 601 may communicate with the electronic device 604 via the server 608. The electronic device 601 may include a processor 620, a memory 630, an input device 650, a sound output device 655, a display device 660, an audio module 670, a sensor module 676, an interface 677, a haptic module 679, a camera module 680, a power management module 688, a battery 689, a communication module 690, a subscriber identification module (SIM) card 696, or an antenna module 697. In one embodiment, at least one (e.g., the display device 660 or the camera module 680) of the components may be omitted from the electronic device 601, or one or more other components may be added to the electronic device 601. Some of the components may be implemented as a single integrated circuit (IC). For example, the sensor module 676 (e.g., a fingerprint sensor, an iris sensor, or an illuminance sensor) may be embedded in the display device 660 (e.g., a display).

The processor 620 may execute software (e.g., a program 640) to control at least one other component (e.g., a hardware or a software component) of the electronic device 601 coupled with the processor 620 and may perform various data processing or computations.

As at least part of the data processing or computations, the processor 620 may load a command or data received from another component (e.g., the sensor module 676 or the communication module 690) in volatile memory 632, process the command or the data stored in the volatile memory 632, and store resulting data in non-volatile memory 634. The processor 620 may include a main processor 621 (e.g., a central processing unit (CPU) or an application processor (AP)), and an auxiliary processor 623 (e.g., a graphics processing unit (GPU), an image signal processor (ISP), a sensor hub processor, or a communication processor (CP)) that is operable independently from, or in conjunction with, the main processor 621. Additionally or alternatively, the auxiliary processor 623 may be adapted to consume less power than the main processor 621, or execute a particular function. The auxiliary processor 623 may be implemented as being separate from, or a part of, the main processor 621.

The auxiliary processor 623 may control at least some of the functions or states related to at least one component (e.g., the display device 660, the sensor module 676, or the communication module 690) among the components of the electronic device 601, instead of the main processor 621 while the main processor 621 is in an inactive (e.g., sleep) state, or together with the main processor 621 while the main processor 621 is in an active state (e.g., executing an application). The auxiliary processor 623 (e.g., an image signal processor or a communication processor) may be implemented as part of another component (e.g., the camera module 680 or the communication module 690) functionally related to the auxiliary processor 623.

The memory 630 may store various data used by at least one component (e.g., the processor 620 or the sensor module 676) of the electronic device 601. The various data may include, for example, software (e.g., the program 640) and input data or output data for a command related thereto. The memory 630 may include the volatile memory 632 or the non-volatile memory 634. Non-volatile memory 634 may include internal memory 636 and/or external memory 638.

The program 640 may be stored in the memory 630 as software, and may include, for example, an operating system (OS) 642, middleware 644, or an application 646.

The input device 650 may receive a command or data to be used by another component (e.g., the processor 620) of the electronic device 601, from the outside (e.g., a user) of the electronic device 601. The input device 650 may include, for example, a microphone, a mouse, or a keyboard.

The sound output device 655 may output sound signals to the outside of the electronic device 601. The sound output device 655 may include, for example, a speaker or a receiver. The speaker may be used for general purposes, such as playing multimedia or recording, and the receiver may be used for receiving an incoming call. The receiver may be implemented as being separate from, or a part of, the speaker.

The display device 660 may visually provide information to the outside (e.g., a user) of the electronic device 601. The display device 660 may include, for example, a display, a hologram device, or a projector and control circuitry to control a corresponding one of the display, hologram device, and projector. The display device 660 may include touch circuitry adapted to detect a touch, or sensor circuitry (e.g., a pressure sensor) adapted to measure the intensity of force incurred by the touch.

The audio module 670 may convert a sound into an electrical signal and vice versa. The audio module 670 may obtain the sound via the input device 650 or output the sound via the sound output device 655 or a headphone of an external electronic device 602 directly (e.g., wired) or wirelessly coupled with the electronic device 601.

The sensor module 676 may detect an operational state (e.g., power or temperature) of the electronic device 601 or an environmental state (e.g., a state of a user) external to the electronic device 601, and then generate an electrical signal or data value corresponding to the detected state. The sensor module 676 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 677 may support one or more specified protocols to be used for the electronic device 601 to be coupled with the external electronic device 602 directly (e.g., wired) or wirelessly. The interface 677 may include, for example, a high-definition multimedia interface (HDMI), a universal serial bus (USB) interface, a secure digital (SD) card interface, or an audio interface.

A connecting terminal 678 may include a connector via which the electronic device 601 may be physically connected with the external electronic device 602. The connecting terminal 678 may include, for example, an HDMI connector, a USB connector, an SD card connector, or an audio connector (e.g., a headphone connector).

The haptic module 679 may convert an electrical signal into a mechanical stimulus (e.g., a vibration or a movement) or an electrical stimulus which may be recognized by a user via tactile sensation or kinesthetic sensation. The haptic module 679 may include, for example, a motor, a piezoelectric element, or an electrical stimulator.

The camera module 680 may capture a still image or moving images. The camera module 680 may include one or more lenses, image sensors, image signal processors, or flashes. The power management module 688 may manage power supplied to the electronic device 601. The power management module 688 may be implemented as at least part of, for example, a power management integrated circuit (PMIC).

The battery 689 may supply power to at least one component of the electronic device 601. The battery 689 may include, for example, a primary cell which is not rechargeable, a secondary cell which is rechargeable, or a fuel cell.

The communication module 690 may support establishing a direct (e.g., wired) communication channel or a wireless communication channel between the electronic device 601 and the external electronic device (e.g., the electronic device 602, the electronic device 604, or the server 608) and performing communication via the established communication channel. The communication module 690 may include one or more communication processors that are operable independently from the processor 620 (e.g., the AP) and supports a direct (e.g., wired) communication or a wireless communication. The communication module 690 may include a wireless communication module 692 (e.g., a cellular communication module, a short-range wireless communication module, or a global navigation satellite system (GNSS) communication module) or a wired communication module 694 (e.g., a local area network (LAN) communication module or a power line communication (PLC) module). A corresponding one of these communication modules may communicate with the external electronic device via the first network 698 (e.g., a short-range communication network, such as BLUETOOTH™, wireless-fidelity (Wi-Fi) direct, or a standard of the Infrared Data Association (IrDA)) or the second network 699 (e.g., a long-range communication network, such as a cellular network, the Internet, or a computer network (e.g., LAN or wide area network (WAN)). These various types of communication modules may be implemented as a single component (e.g., a single IC), or may be implemented as multiple components (e.g., multiple ICs) that are separate from each other. The wireless communication module 692 may identify and authenticate the electronic device 601 in a communication network, such as the first network 698 or the second network 699, using subscriber information (e.g., international mobile subscriber identity (IMSI)) stored in the subscriber identification module 696.

The antenna module 697 may transmit or receive a signal or power to or from the outside (e.g., the external electronic device) of the electronic device 601. The antenna module 697 may include one or more antennas, and, therefrom, at least one antenna appropriate for a communication scheme used in the communication network, such as the first network 698 or the second network 699, may be selected, for example, by the communication module 690 (e.g., the wireless communication module 692). The signal or the power may then be transmitted or received between the communication module 690 and the external electronic device via the selected at least one antenna.

Commands or data may be transmitted or received between the electronic device 601 and the external electronic device 604 via the server 608 coupled with the second network 699. Each of the electronic devices 602 and 604 may be a device of a same type as, or a different type, from the electronic device 601. All or some of operations to be executed at the electronic device 601 may be executed at one or more of the external electronic devices 602, 604, or 608. For example, if the electronic device 601 should perform a function or a service automatically, or in response to a request from a user or another device, the electronic device 601, instead of, or in addition to, executing the function or the service, may request the one or more external electronic devices to perform at least part of the function or the service. The one or more external electronic devices receiving the request may perform the at least part of the function or the service requested, or an additional function or an additional service related to the request and transfer an outcome of the performing to the electronic device 601. The electronic device 601 may provide the outcome, with or without further processing of the outcome, as at least part of a reply to the request. To that end, a cloud computing, distributed computing, or client-server computing technology may be used, for example.

Embodiments of the subject matter and the operations described in this specification may be implemented in digital electronic circuitry, or in computer software, firmware, or hardware, including the structures disclosed in this specification and their structural equivalents, or in combinations of one or more of them. Embodiments of the subject matter described in this specification may be implemented as one or more computer programs, i.e., one or more modules of computer-program instructions, encoded on computer-storage medium for execution by, or to control the operation of data-processing apparatus. Alternatively or additionally, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer-storage medium can be, or be included in, a computer-readable storage device, a computer-readable storage substrate, a random or serial-access memory array or device, or a combination thereof. Moreover, while a computer-storage medium is not a propagated signal, a computer-storage medium may be a source or destination of computer-program instructions encoded in an artificially-generated propagated signal. The computer-storage medium can also be, or be included in, one or more separate physical components or media (e.g., multiple CDs, disks, or other storage devices). Additionally, the operations described in this specification may be implemented as operations performed by a data-processing apparatus on data stored on one or more computer-readable storage devices or received from other sources.

While this specification may contain many specific implementation details, the implementation details should not be construed as limitations on the scope of any claimed subject matter, but rather be construed as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described herein. Other embodiments are within the scope of the following claims. In some cases, the actions set forth in the claims may be performed in a different order and still achieve desirable results. Additionally, the processes depicted in the accompanying figures do not necessarily require the particular order shown, or sequential order, to achieve desirable results. In certain implementations, multitasking and parallel processing may be advantageous.

As will be recognized by those skilled in the art, the innovative concepts described herein may be modified and varied over a wide range of applications. Accordingly, the scope of claimed subject matter should not be limited to any of the specific exemplary teachings discussed above, but is instead defined by the following claims.

What is claimed is:

1. A method comprising:

receiving a request at a cache memory, wherein the request comprises a first tag and the first tag comprises bits;

performing a first comparison of a first subset of the bits to entries of a first storage of the cache memory, wherein each entry of the first storage comprises a subset of bits of a corresponding tag in a second storage of the cache memory;

determining one or more potential matching entries of the second storage for the request based on the first comparison;

in response to determining the one or more potential matching entries, performing a second comparison of the bits to tags of the one or more potential matching entries to determine whether the second storage comprises a matching entry for the request; and in response to determining the one or more potential matching entries, selecting only the one or more potential matching entries for the second comparison.

2. The method of claim 1, wherein the request comprises a set number, the first storage comprises a plurality of sets with each set comprising a number of entries, and the second storage comprises the plurality of sets with each set comprising the number of tags.

3. The method of claim 2, wherein performing the first comparison comprises comparing the first subset of the bits to entry bits in the first storage, wherein the one or more potential matching entries are determined based on corresponding entries in the first storage that match the first subset of bits.

4. The method of claim 3, wherein the first comparison is performed for entries of the set number in the first storage.

5. The method of claim 3, wherein the one or more potential matching entries of the second storage are determined based on an override indication from at least one alternative storage source, wherein the override indication enables selection of additional second storage entries subject to data replacement or allocation.

6. The method of claim 1, wherein:

the second storage comprises the matching entry, and further comprising retrieving data of the matching entry from the second storage; or the second storage comprises non-matching entries, and further comprising allocating a matching tag to the second storage.

7. The method of claim 6, further comprising:

updating the first storage and the second storage based on the retrieving or the allocating.

8. The method of claim 1, wherein performing the second comparison comprises comparing each of the bits of the first tag to corresponding bits of the tags, wherein the matching entry comprises a second tag with the bits of the first tag.

9. The method of claim 1, wherein performing the second comparison comprises comparing a remaining subset of the bits of the first tag to corresponding subsets of bits of the tags, wherein the matching entry comprises the remaining subset of the bits of the first tag.

10. The method of claim 1, wherein the second storage is a main storage element of the cache memory, and the first storage is a duplication of a portion of the main storage element, or the main storage element is split into the first storage and the second storage, which is larger than the first storage.

11. A storage device comprising:

cache memory configured to receive a request, wherein the request comprises a first tag and the first tag comprises bits, wherein the cache memory comprises:

a first storage comprising entries with a subset of bits of corresponding tags in a second storage;

a first comparator configured to perform a first comparison of a first subset of the bits of the first tag to the entries of the first storage;

a selector configured to select one or more potential matching entries of the second storage for the request based on the first comparison;

the second storage; and a second comparator configured to perform a second comparison of the bits of the first tag to tags of only the one or more potential matching entries to determine whether the second storage comprises a matching entry for the request.

12. The storage device of claim 11, wherein the request comprises a set number, the first storage comprises a plurality of sets with each set comprising a number of entries, and the second storage comprises the plurality of sets with each set comprising the number of tags.

13. The storage device of claim 12, wherein the first comparator is configured to compare the first subset of the bits to entry bits in the first storage, wherein the one or more potential matching entries are determined based on corresponding entries in the first storage that match the first subset of bits.

14. The storage device of claim 13, wherein the first comparison is performed for entries of the set number in the first storage.

15. The storage device of claim 13, wherein the cache memory further comprises at least one alternative storage source, and the selector is configured to receive an override indication from the at least one alternative storage source, wherein the override indication enables selection of additional second storage entries subject to data replacement or allocation.

16. The storage device of claim 11, wherein:

the second storage comprises the matching entry, and data of the matching entry is retrieved from the second storage; or the second storage comprises non-matching entries, and a matching tag is allocated to the second storage.

17. The storage device of claim 16, further comprising an update module configured to update the first storage and the second storage based on the retrieving or the allocating.

18. The storage device of claim 11, wherein the second comparator is configured to compare each of the bits of the first tag to corresponding bits of the tags, wherein the matching entry comprises a second tag with the bits of the first tag.

19. The storage device of claim 11, wherein the second comparator is configured to compare a remaining subset of the bits of the first tag to corresponding subsets of bits of the tags, wherein the matching entry comprises the remaining subset of the bits of the first tag.

20. A user equipment (UE) comprising:

a processor; and a non-transitory computer readable storage medium storing instructions that, when executed, cause the processor to:

receive a request at a cache memory, wherein the request comprises a first tag and the first tag comprises bits;

perform a first comparison of a first subset of the bits to entries of a first storage of the cache memory, wherein each entry of the first storage comprises a subset of bits of a corresponding tag in a second storage of the cache memory;

determine one or more potential matching entries of the second storage for the request based on the first comparison; and in response to determining the one or more potential matching entries, perform a second comparison of the bits to tags of only the one or more potential matching entries to determine whether the second storage comprises a matching entry for the request.

* * * * *